Feb. 5, 1946.  R. K. HOPKINS  2,394,383
METHOD FOR PROCESSING CLAD MATERIAL
Filed Aug. 12, 1943
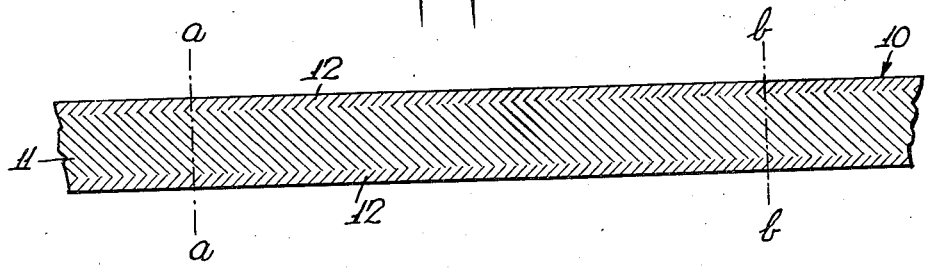
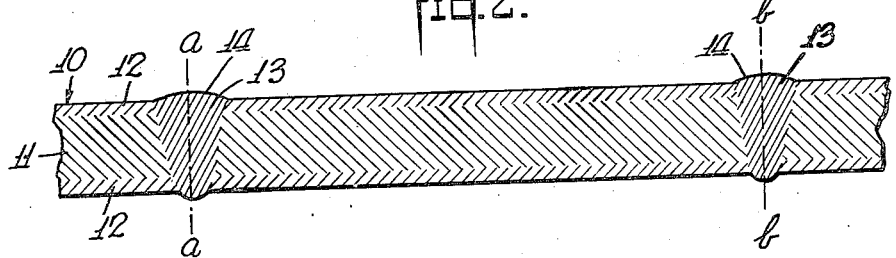
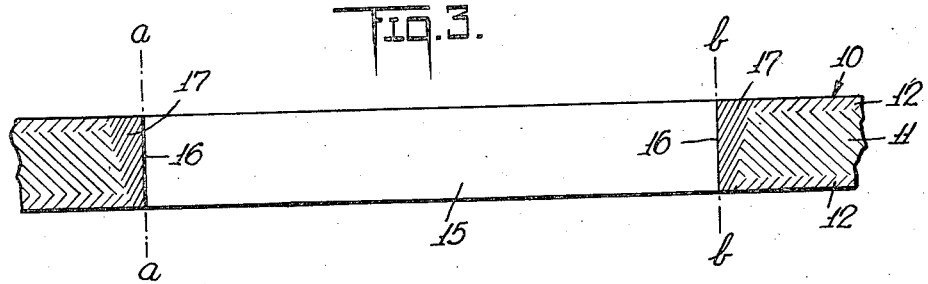
INVENTOR
Robert K. Hopkins
BY
Virgil F. Danco
ATTORNEY Patented Feb. 5, 1946

2,394,383

UNITED STATES PATENT OFFICE 2,394,383

METHOD FOR PROCESSING CLAD
MATERIAL

Robert K. Hopkins, New York, N. Y., assignor to
The M. W. Kellogg Company, New York, N. Y.,
a corporation of Delaware Application August 12, 1943, Serial No. 498,388

1 Claim. (Cl. 29—189)

The present invention relates to a method of processing clad metal material to produce thereon an edge having a coating of protective metal.

If a body of armored or clad metal is cut, a raw edge results along which all of the component zones of the body are bared. Since the base zone consists of metal having comparatively low resistance to corrosion, oxidation, wear or other destructive action, the exposed base metal along said edge must be armored with protective metal if the body is to withstand the intended service satisfactorily.

One object of the present invention is to provide a comparatively simple and expeditious method by which clad material may be cut and an edge produced that is covered by a coating of protective metal integrally bonded to the different component zones of the material.

Another object is to provide a comparatively simple and expeditious method by which clad material may be cut and an edge produced that is covered throughout its area by a coating of metal integrally bonded to the different component zones of the material and having an analysis substantially the same as that of an outer protective zone of said material.

A further object is to provide a method of preparing a clad material so that upon the cutting of a hole therein, the marginal edge thereof will have a coating of protective metal covering substantially its entire area.

Various other objects, features and advantages of the invention will be apparent from the following particular description, and from an inspection of the accompanying drawing, in which Fig. 1 is a section of a conventional body of clad or armored material prior to being processed in accordance with the method of the present invention;

Fig. 2 shows the section of the clad body of Fig. 1 after it has been conditioned in accordance with the method of the present invention, but before it has been cut; and Fig. 3 shows the section of the clad body of Fig. 2, but after it has been cut.

The method of the present invention is applied to a coated metal article shown in the drawing as a conventional body 10 of clad or armored material, having a single or double coating. Body 10 may be a sheet, plate, slab, and ingot, etc. In the specific form shown, the composite body 10 has a base zone 11, and is doubly coated by two face zones 12 integrally bonded to said base zone throughout their common extent. The base zone 11 may, for example, be carbon steel, low alloy steel or any of the other ferrous or non-ferrous metals commonly employed in the manufacture of vessels, containers and the like. The facing zones 12 may be of any ferrous or non-ferrous metal or alloy, such as chrome steel, chrome-nickel steel, manganese steel, Monel metal and the like, having corrosion, oxidation, wear or other resisting property superior to that of the base zone 11 for the intended purpose.

The composite body 10 as shown in Fig. 1 is intended to be cut, for example, for perforation circularly along the lines a—a and b—b indicating the diametrical opposed margins of the intended line of cut. To prepare the body 10 in accordance with the method of the present invention for cutting, there is produced in the body 10 along its intended line of cut a vein 13 of weld metal as shown in Fig. 2 integrally bonded to the component zones 11 and 12 of the body, and affording the desired protective coating for the base zone 11 when said body is cut along said line of cut. To impart to the weld 13 the required protective property, this weld desirably has an analysis which is the same substantially as that of the face zones 12. However, as far as certain aspects of the invention are concerned, this weld 13 may have an analysis different from that of the face zones 12 as long as it has the required protective or resisting properties.

In a case where a hole is to be cut out of the clad body 10, the weld 13 is produced in said sheet as a closed endless vein or partition. In the specific form of the invention shown, this weld 13 is in the form of a circular ring extending circumferentially along the intended cutting line of the hole with said cutting line located substantially centrally with respect to the radial thickness of said ring, as shown in Fig. 2.

The weld 13 is autogenously produced in the body 10 by any suitable welding process while said body is in one piece. For example, it may be produced by arc welding through the use of a bare or coated electrode having the desired composition, so that when the metal of said electrode is fused and mixed with the fused metal of the clad body 10, the resulting metal will have substantially the desired analysis. This welding operation may be carried out without preliminary weld grooving of the body 10, and is controlled to produce a weld 13 having the desired analysis, thickness and depth. When body 10 is of excessive thickness it may be necessary to provide a groove for the deposition of weld metal 13. The heat of the welding operation fuses not only the metal of the electrode or other metal which might be employed, but also the section of the body 10 along the intended cutting line, and causes thorough and rapid diffusion of the metal ingredients in the fused mixture, so that the resulting weld 13 will be of sound uniform composition and will be integrally and inseparably bonded to the component zones 11 and 12 of the body 10 to the full depth of said body.

After the composite body 10 has been processed as described and shown in Fig. 2 to provide the weld 13 along its intended cutting line, the weld overlays 14 projecting beyond the surfaces of said sheet may be removed. This removal of the weld overlays 14 is desirably effected by grinding the weld 13 flush with the surfaces of the composite sheet 10. As far as certain aspects of the invention are concerned, this weld overlay 14 may be removed by any other suitable means, as for example, by chipping.

After the clad body 10 has been processed as described so far, a circular hole 15 is sheared or otherwise incisively cut from said body along the lines a—a and b—b as shown in Fig. 3. This cutting of the hole 15 may be effected by punching, machining, shearing, trepanning, etc. The resulting hole 15 will have a marginal edge 16 protectively covered by the outer circumferential portion 17 of the weld 13. This edge coating 17 will form with the outer facing zones 12 a continuous integral protective covering for the base zone 11 throughout the entire exposed surfaces of the clad body 10, including those exposed by perforation of said sheet. Although this edge coating 17 may be of any suitable analysis to afford the desired protection to the base zone 11, as far as certain aspects of the invention are concerned it is desirably of stainless steel, and has a composition similar to that of the facing zones 12. When zones 12 are of different composition coating 17 will usually be made of the same analysis as the preferred one of the zones.

Although the invention is shown applied to the fabrication of a clad body having a hole protectively covered at its marginal edge, as far as certain aspects of the invention are concerned, the invention can be applied to the fabrication of a clad body having any kind of an edge, straight or otherwise, covered with a coating of protective metal. The operation of producing a vein of weld metal along the intended line of severance of a clad body for the purpose described is a much simpler and more expeditious method than welding the protective metal coating to the exposed edge of the body after severance of said body. Furthermore, by the process of the present invention, a cut edge will be produced which is smooth and substantially finished. On the other hand, the welding of a protective metal coating to the exposed edge of the body after severance of said body will produce a rough irregular edge, which will have to be machined or otherwise finished.

As many changes can be made in the above method, and many apparently widely different embodiments of this invention can be made without departing from the scope of the claim, it is intended that all matter contained in the above description or shown in the accompanying drawing shall be interpreted as illustrative and not in a limiting sense.

I claim:

A process of producing a severed edge defined entirely by protective metal in a composite metal article whose cross-section throughout is made up of base metal united to at least a covering zone of protective metal, which comprises fusing a strip of said article along the line of the desired edge and simultaneously depositing metallic ingredients in the fused strip to produce a partition of weld metal extending throughout the full cross-section of said article along the line of the desired edge of a desired protective analysis, and cutting said article along the line of the desired edge to produce a severed edge defined entirely by protective metal.

ROBERT K. HOPKINS.